UNITED STATES PATENT OFFICE.

DAVIS NIXON, OF PHILADELPHIA, PENNSYLVANIA.

IMPROVEMENT IN MEDICAL COMPOUNDS OR APPLE-GINGERS.

Specification forming part of Letters Patent No. 118,812, dated September 12, 1871.

*To all whom it may concern:*

Be it known that I, DAVIS NIXON, of the city and county of Philadelphia and State of Pennsylvania, have invented a certain Compound called "Nixon's Celebrated Apple-Ginger," to be used for medicinal purposes and also as a beverage.

The nature of the invention of the said DAVIS NIXON consists in dissolving, mixing, and holding in solution rock-candy, common water, apple-brandy made from apple-cider, extracts of Jamaica ginger-root, blackberry-root, and sarsaparilla-root, and extract of brustar-seed, together with a mixture of castor-oil and alcohol.

To prepare "Nixon's celebrated apple-ginger" take six pounds of rock-candy and pour over it three quarts of boiling-hot water to dissolve the same, in a wooden or other vessel. Add one gallon of apple-brandy, sixty per cent. above first-proof, made from apple-cider; six ounces of extract of Jamaica ginger-root; two ounces of extract of blackberry-root; six ounces of extract of sarsaparilla-root; and three ounces of extract of brustar-seed. Add also a mixture of two ounces of castor-oil and six ounces of alcohol, ninety-five per cent.

I claim as my invention—

The manufacture or preparation of a compound which is denominated "Nixon's celebrated apple-ginger," of the ingredients, in the proportions, and for the purposes set forth.

DAVIS NIXON.

Witnesses:
   MORGAN H. JONES,
   HENRY W. BIRKEY.